United States Patent
Lin et al.

(10) Patent No.: US 7,546,191 B2
(45) Date of Patent: Jun. 9, 2009

(54) HANDWHEEL DAMPING CONTROL OF ACTIVE STEERING SYSTEM

(75) Inventors: William C. Lin, Troy, MI (US); Shih-Ken Chen, Troy, MI (US); Robert R. Bolio, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 867 days.

(21) Appl. No.: 11/017,420

(22) Filed: Dec. 20, 2004

(65) Prior Publication Data

US 2006/0136108 A1 Jun. 22, 2006

(51) Int. Cl.
*B62D 5/00* (2006.01)
*B62D 6/00* (2006.01)

(52) U.S. Cl. .................. 701/42; 180/443
(58) Field of Classification Search .......... None
See application file for complete search history.

(56) References Cited

U.S. PATENT DOCUMENTS

| | | | | |
|---|---|---|---|---|
| 4,741,408 A * | 5/1988 | Bausch et al. | ............... | 180/443 |
| 4,834,203 A * | 5/1989 | Takahashi et al. | ........... | 180/446 |
| 4,840,389 A * | 6/1989 | Kawabe et al. | .............. | 180/415 |
| 4,875,541 A * | 10/1989 | Oshita et al. | ................ | 180/446 |
| 4,951,199 A * | 8/1990 | Whitehead | ................... | 701/41 |
| 4,951,207 A * | 8/1990 | Furukawa et al. | ............. | 701/42 |
| 5,032,997 A * | 7/1991 | Kawagoe | ..................... | 701/48 |
| 5,073,860 A * | 12/1991 | Blackburn et al. | ............ | 701/47 |
| 5,151,860 A * | 9/1992 | Taniguchi et al. | ............. | 701/41 |
| 5,258,912 A * | 11/1993 | Ghoneim et al. | ............. | 701/42 |
| 5,275,474 A * | 1/1994 | Chin et al. | .................. | 303/148 |
| 5,337,238 A * | 8/1994 | Gioutsos et al. | ............... | 701/47 |
| 5,428,537 A * | 6/1995 | Kamono et al. | ............... | 701/41 |
| 5,481,457 A * | 1/1996 | Yamamoto et al. | ............ | 701/41 |
| 5,513,108 A * | 4/1996 | Kishimoto et al. | ............ | 701/38 |
| 5,568,389 A * | 10/1996 | McLaughlin et al. | .......... | 701/41 |
| 5,596,252 A * | 1/1997 | Shimizu et al. | ............. | 318/432 |
| 5,668,722 A * | 9/1997 | Kaufmann et al. | ............ | 701/41 |
| 5,690,361 A * | 11/1997 | Mouri | ........................ | 280/771 |
| 5,709,281 A * | 1/1998 | Sherwin et al. | ............. | 180/272 |
| 5,719,766 A * | 2/1998 | Bolourchi et al. | ............. | 701/42 |
| 5,743,351 A * | 4/1998 | McLaughlin | ................ | 180/446 |
| 5,801,619 A * | 9/1998 | Liu et al. | .................... | 340/436 |
| 5,884,203 A * | 3/1999 | Ross | ........................... | 701/45 |
| 5,899,948 A * | 5/1999 | Raphael et al. | ............... | 701/45 |
| 5,904,730 A * | 5/1999 | Yamazaki et al. | ........... | 701/301 |
| 5,919,241 A * | 7/1999 | Bolourchi et al. | ............. | 701/41 |
| 5,957,987 A * | 9/1999 | Sudo et al. | .................... | 701/41 |
| 5,979,587 A * | 11/1999 | Liubakka et al. | ............ | 180/446 |
| 6,122,579 A * | 9/2000 | Collier-Hallman et al. | .... | 701/41 |
| 6,122,584 A | 9/2000 | Lin et al. | | |
| 6,152,254 A * | 11/2000 | Phillips | ....................... | 180/422 |

(Continued)

*Primary Examiner*—Jack W Keith
*Assistant Examiner*—Ari M Diacou (57) ABSTRACT

An active front steering (AFS) system that provides hand-wheel damping. The AFS system includes a damping control sub-system that determines a hand-wheel angular velocity based on the rate of change of a hand-wheel angle signal. The damping control sub-system determines the damping control signal by multiplying the angular velocity of the hand-wheel angle signal with a control gain. The damping control signal is added to a steering signal from a variable gear ratio control sub-system to generate a steering command signal. The damping control sub-system sets to the damping control signal to zero if a signal from a vehicle stability enhancement sub-system is activated.

12 Claims, 3 Drawing Sheets

U.S. PATENT DOCUMENTS

| | | | |
|---|---|---|---|
| 6,161,068 A * | 12/2000 | Kurishige et al. | 701/41 |
| 6,203,060 B1 * | 3/2001 | Cech et al. | 280/735 |
| 6,240,350 B1 * | 5/2001 | Endo | 701/41 |
| 6,272,412 B1 * | 8/2001 | Wu et al. | 701/47 |
| 6,301,534 B1 * | 10/2001 | McDermott et al. | 701/41 |
| 6,450,287 B1 * | 9/2002 | Kurishige et al. | 180/446 |
| 6,527,079 B2 * | 3/2003 | Takeuchi et al. | 180/443 |
| 6,564,898 B2 * | 5/2003 | Takehara et al. | 180/444 |
| 6,598,699 B2 * | 7/2003 | Takehara et al. | 180/446 |
| 6,644,688 B1 * | 11/2003 | Hu et al. | 280/735 |
| 6,658,335 B2 * | 12/2003 | Kleinau | 701/41 |
| 2001/0041957 A1 * | 11/2001 | McCann et al. | 701/41 |
| 2002/0005314 A1 * | 1/2002 | Takehara et al. | 180/443 |
| 2002/0020577 A1 * | 2/2002 | Takehara et al. | 180/443 |
| 2002/0053481 A1 * | 5/2002 | Itakura et al. | 180/446 |
| 2002/0056587 A1 * | 5/2002 | Shibasaki et al. | 180/443 |
| 2002/0087241 A1 * | 7/2002 | Nakano et al. | 701/41 |
| 2003/0024759 A1 * | 2/2003 | Williams et al. | 180/443 |
| 2003/0052639 A1 * | 3/2003 | Tanaka et al. | 318/632 |
| 2003/0074120 A1 * | 4/2003 | Kleinau | 701/41 |
| 2003/0121716 A1 * | 7/2003 | Yamada et al. | 180/446 |
| 2003/0146041 A1 * | 8/2003 | Kanda | 180/446 |
| 2003/0173141 A1 * | 9/2003 | Itakura et al. | 180/446 |
| 2004/0061465 A1 * | 4/2004 | Matsuoka | 318/432 |

* cited by examiner

HANDWHEEL DAMPING CONTROL OF ACTIVE STEERING SYSTEM

BACKGROUND OF THE INVENTION

1. Field of the Invention

This invention relates generally to an active front steering (AFS) system for a vehicle and, more particularly, to an AFS system for a vehicle that provides hand-wheel damping.

2. Discussion of the Related Art

Active front steering (AFS) systems are known in the art for providing automatic front-wheel steering in combination with the vehicle operator's steering command. AFS systems typically employ a steering actuator system that receives a vehicle operator intended steering signal from a hand-wheel sensor, a vehicle speed signal and a vehicle yaw rate signal. The steering actuator system provides a correction to the operator steering signal to cause the vehicle to more closely follow the vehicle operator's intended steering path and increase vehicle stability and handling. The AFS system is able to provide steering corrections much quicker than the vehicle operator's reaction time, so that the amount of operator steering is reduced.

The AFS system operates in conjunction with a variable gear ratio (VGR) system that changes the steering signal gear ratio for different vehicle speeds and provides low-speed maneuverability and high-speed stability. The vehicle-level control is provided by algorithms to provide the vehicle-level performance. These control algorithms are not affected by actuator control in the AFS system, which might provide poor hand-wheel damping. For example, the actuator in the AFS system that provides the automatic front-wheel steering could cause the vehicle hand-wheel to slightly oscillate when it returns to the straight steering position. Although this oscillation does not affect vehicle handling and performance, it is undesirable.

SUMMARY OF THE INVENTION

In accordance with the teachings of the present invention, an active front steering (AFS) system is disclosed that provides hand-wheel damping. The AFS system includes a damping control sub-system that receives a vehicle speed signal of the speed of the vehicle and a hand-wheel angle signal indicative of the hand-wheel angle. The damping control sub-system determines a hand-wheel angular velocity based on the rate of change of the hand-wheel angle signal. The damping control sub-system also determines a damping control gain having two parts. The first damping control gain part is based on the vehicle speed and the second damping control gain part is based on the hand-wheel angle. The damping control sub-system then determines the damping control gain by multiplying the hand-wheel angular velocity times the control gain. The damping control signal is added to a steering signal from a variable gear ratio control sub-system to generate a steering command signal. The steering command signal is applied to an actuator controller that controls an actuator associated with the AFS system. The damping control sub-system turns off the damping control if a signal from a vehicle stability enhancement sub-system is activated.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to hand-wheel damping control for an AFS system is merely exemplary in nature, and is in no way intended to limit the invention or its applications or uses.

Figure 1:
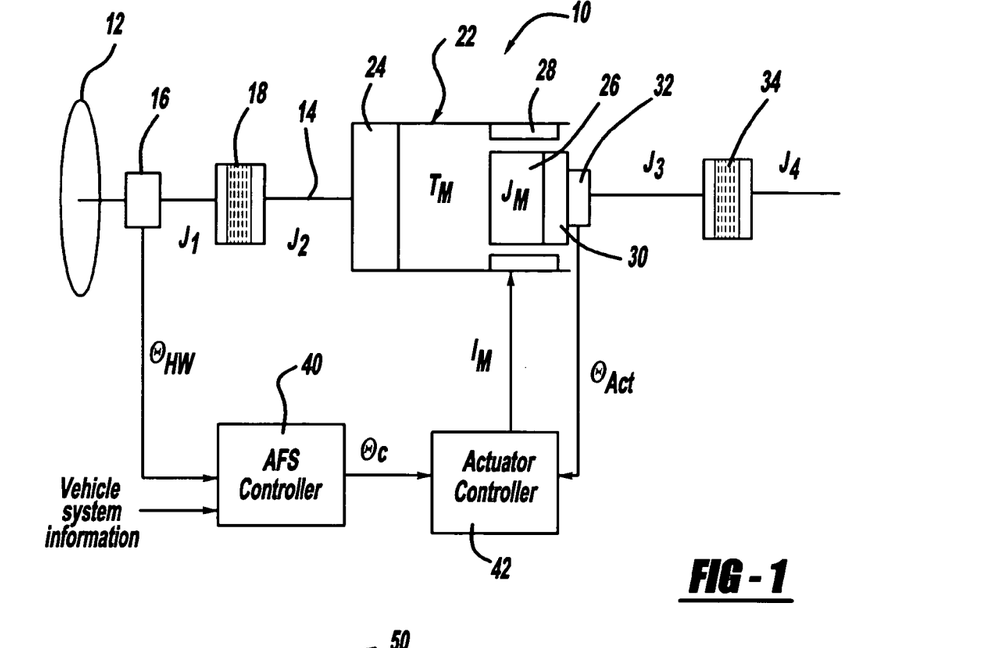
FIG. 1 is a schematic diagram of a vehicle steering column, intermediate shaft and AFS actuator.

As will be discussed in detail below, the present invention proposes adding a damping control term to a command signal received by an actuator controller in the AFS system. The actuator controller then controls an actuator that provides the vehicle steering. In order to properly determine the damping control term, an analysis of a steering system model is provided. FIG. 1 is a schematic diagram of a vehicle steering system 10 used for developing the model. The vehicle steering system 10 includes a vehicle hand-wheel 12 mounted to a steering shaft 14. A hand-wheel angle sensor 16 provides a signal indicative of the rotation of the hand-wheel 12 to provide the vehicle operator's steering intent. An isolator 18 mounted to the shaft 14 isolates the rotation of the hand-wheel 12 from the mechanism that turns the vehicle wheels. The steering system 10 further includes an AFS actuator 22 mounted to the steering shaft 14. The actuator 22 includes an actuator stator 24 and an actuator rotor 26 positioned relative to an annular magnet 28. The actuator 22 also includes a harmonic drive gear reduction device 30 and an actuator angle sensor 32. A CV joint 34 is also mounted to the shaft 14 and provides the necessary gear ratio to the vehicle wheels (not shown). The isolator 18 and the CV joint 34 couple the actuator 22 to the shaft 14.

The system 10 includes an AFS controller process block 40 that receives the hand-wheel angle signal from the hand-wheel angle sensor 16, a vehicle speed signal Vx, a vehicle yaw rate signal YR and a vehicle lateral acceleration signal Ay. The process block 40 generates a steering command signal $\theta_c$ that is applied to an actuator controller process block 42. The actuator controller process block 42 receives an actuator angle signal from the actuator angle sensor 32 and generates an actuator control signal Im to control the actuator 22.

The following nomenclature is used to generate the AFS system model.

$\theta_{HW}$ is the hand-wheel angular displacement;
$\theta_1$ is the isolator (flexible coupling) input angle;
$\theta_2$ is the isolator (flexible coupling) output angle;
$\theta_{Act}$ is the actuator angle reflected to the output shaft of the actuator (geared down);

$\theta_3$ is the CV joint input angle;
$\theta_{04}$ is the CV joint output angle (T-bar input angle);
$\theta_{TB}$ is the torsion bar input angle;
$\omega_{HW}$ is the hand-wheel angular velocity;
$\omega_1$ is the isolator (flexible coupling) input speed;
$\omega_2$ is the isolator (flexible coupling) output speed;
$\omega_{Act}$ is the actuator speed reflected to the output shaft of the actuator (geared down);
$\omega_4$ is the CV joint input speed;
$\omega_4$ is the CV joint output speed (T-bar input angle);
$J_1$ is the lumped inertia of the steering column reflected to the isolator input;
$J_2$ is the lumped inertia of the portion of the I-shaft and the actuator reflected to the isolator output;
$J_M$ is the actuator motor inertia reflected to actuator output shaft;
$J_3$ is the lumped inertia of the portion of the I-shaft and the actuator rotor reflected to the CV joint input;
$J_4$ is the lumped inertia of the portion of the I-shaft reflected to the CV joint output;
$K_{12}$ is the lumped stiffness: isolator portion of the I-shaft and the actuator;
$K_{34}$ is the lumped stiffness: portion of the I-shaft and the CV joint;
$K_T$ is the motor torque constant (Nm/amp);
$I_M$ is the motor current;
$T_M$ is the actuator motor torque reflected to the stator (Nm);
$T_{TB}$ is the torsion bar torque (Nm);
HW is the hand-wheel torque (Nm);
$T_1$ is the torque at the isolator input (Nm);
$T_2$ is the torque at the isolator output (Nm);
$T_3$ is the torque at the CV joint input (Nm);
$T_4$ is the torque at the CV joint output (Nm);
$B_{12}$ is the isolator damping friction constant (Nm/rad/s);
$B_{34}$ is the CV joint damping friction constant (Nm/rad/s);
$B_M$ is the actuator bearing/housing viscous friction constant (Nm/rad/s);
$F_A$ is the actuator friction at the harmonic-drive reduction gear reflected to the motor;
$F_{34}$ is the CV joint friction (Nm);
$H_{12}$ is the isolator hysteresis (deg);
$H_{34}$ is the CV joint hysteresis (deg);
$H_G$ is the harmonic drive hysteresis (deg); and
N is the actuator motor gear reduction ratio.

In the model analysis, the following assumptions are made. First, the portion of the steering column 14 from the hand-wheel sensor 16 to the input of the isolator 18 is infinitely stiff, and the kinematical relationship between $\theta_1$ and $\theta_{HW}$ due to the upper U-joint is simplified to $\theta_{HW}=\theta_1$. Further, the actuator 22 is controlled in a current mode. Also, the torque transmission in the harmonic drive device 30 is linear with constant static friction irrestrictive of angular speed and acceleration. Further, there is no delay in the data transmission for the actuator command $\theta_c$ and the actuator angle information for its control. And finally, there is no discrepancy between the motor current command signal and the motor current.

Based on these assumptions, the following relationships are established:

$$\theta_{HW}=\theta_1$$

$$\theta_{Act}=\theta_3$$

$$\theta_{TB}=\theta_4 \tag{1}$$

The dynamic equations of the system 10 are described as:

$$J_2\frac{d\omega_2}{dt} = T_1 - (T_M - F_A - B_M(\omega_2 - \omega_3)) \tag{2}$$

$$J_3\frac{d\omega_3}{dt} = \tag{3}$$
$$T_M - F_A - B_M(\omega_2 - \omega_3) - (K_{34}(\theta_3 - \theta_4) - B_{34}(\omega_3 - \omega_4) - F_{34})$$

$$J_4\frac{d\omega_4}{dt} = (K_{34}(\theta_3 - \theta_4) - B_{34}(\omega_3 - \omega_4) - F_{34}) - T_{TB} \tag{4}$$

The lumped inertia of the I-shaft reflected to the CV-joint input is largely $J_3=N^2 J_M$ plus the inertia of the corresponding part of the I-shaft and joint.

The motor torque is expressed as:

$$T_M = NK_T I_M \tag{5}$$

Where $I_M$ is a dynamic function of actuator command and position.

$$I_M = f(\theta_C, \theta_{Act}) \tag{6}$$

The vehicle operator's steering feel is the torque output of the dynamic system.

$$T_{HW}=T_1 \tag{7}$$

Where, $$T_1 = K_{12}(\theta_1-\theta_2) - B_{12}(\omega_1-\omega_2) \tag{8}$$

Although it is desirable to use the detailed model for the analysis of the AFS system dynamics so the hand-wheel damping problem can be accurately addressed. The problem can still be addressed through engineering ingenuity even if such detailed information is lacking by looking into a simplified model of the dynamics of the AFS system.

Figure 2:
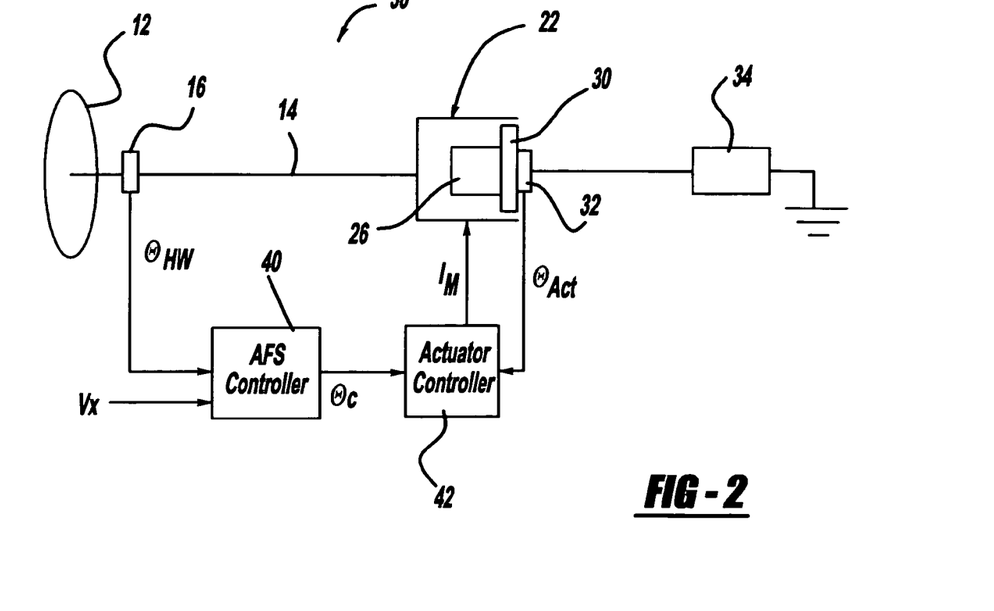
FIG. 2 is a simplified schematic diagram of the schematic diagram shown in FIG. 1.

Because the hand-wheel damping is an issue only when the vehicle operator is not exerting a significant amount of steering torque to the hand-wheel 12, it is further assumed that the flexible coupling and the CV joint 34 are infinitely rigid under that situation. Therefore, the system 10 can be reduced to a simplified schematic for the analysis. Particularly, FIG. 2 shows a simplified AFS system 50 where like elements to the system 10 are identified with the same reference numeral.

First, $\theta_a$ is defined as the angular displacement above the AFS actuator 22 and $\theta_b$ as the angular displacement below the actuator 22 in the system 50 as:

$$\theta_a = \theta_{HW} = \theta_1 = \theta_2 \tag{9}$$
$$\omega_a = \frac{d\theta_a}{dt}$$
$$\theta_b = \theta_{Act} = \theta_3 = \theta_4$$
$$\omega_b = \frac{d\theta_b}{dt}$$

Let $J_{1eq}$ be the lumped inertia from the hand-wheel 12 to the actuator 22 and $J_{2eq}$ be the lumped inertia from the actuator rotor 26 to the top of the torsion bar. Therefore, a set of differential equations can be written to describe the simplified AFS dynamics as:

$$J_{1eq}\ddot{\theta}_a + B_a\dot{\theta}_a + T_M = 0$$

$$J_{2eq}\ddot{\theta}_b + B_b\dot{\theta}_b = T_M - K_{TW}\theta_b - B_{TW}\dot{\theta}_b \tag{10}$$

Where $K_{TW}$ and $B_{TW}$ are tire-and-wheel torque constant and a damping coefficient reflected to the torsion bar, respectively.

To further investigate the potential contributing factors to the hand-wheel oscillation problem so as to offer a solution or mitigation for its damping control, the actuator motor torque $T_M$ needs to be addressed. Without any specific information of the actuator motor torque control, general terms from what the state-of-the-art mechatronic system may offer using a brushless DC motor as a common actuator can be formulated as:

$$T_M = K_T I_M \quad (11)$$

$$I_M = K_p(\theta_c - \theta_b) + K_d\left(\frac{d\theta_c}{dt} - \frac{d\theta_b}{dt}\right) - K_{MD}\left(\frac{d\theta_b}{dt} - \frac{d\theta_a}{dt}\right)$$

Where $K_p$ and $K_d$ are the proportional and derivative control gains for motor current control, respectively, and $K_{MD}$ is a motor damping control term usually applied when the actuator motor is controlled using a current-control mode rather than a voltage-control mode, which offers a more precise control as the state-of-the-art control of actuators using brushless DC motors.

The variable $\theta_c$ represents the actuator command, which can include various components for different purposes:

$$\theta_c = (1+K_G)\theta_{HW} + \theta_{VSE} + \theta_{HWD} \quad (12)$$

Where $\theta_{VSE}$ represents the AFS control component from the vehicle stability enhancement control (discussed below), $\theta_{HWD}$ represents the AFS control component from the hand-wheel damping control, and $K_G$ represents the control gain to generate the augmentative steering component to achieve the variable gear ratio, and is usually a function of vehicle speed.

It is determined in the present invention that the control term for hand-wheel damping be designed and expressed as a function of the hand-wheel rate of rotation. Therefore, the AFS actuator command can be rewritten without regard to the vehicle stability enhancement as:

$$\theta_C = (1+K_G)\theta_{HW} + K_{HWD}\frac{d\theta_{HW}}{dt} \quad (13)$$

Next, the factors contributing to the AFS hand-wheel overshoot/oscillation problem are determined under dynamic control structure, and, further, the potential remedy through its damping control. By rearranging the equations for the actuator motor torque $T_M$, it can be expressed in terms of the system variables as:

$$T_M = K_T I_M \quad (14)$$

$$= K_T\left(K_p(\theta_c - \theta_b) + K_d(\dot{\theta}_c - \dot{\theta}_b) - K_{MD}(\dot{\theta}_b - \dot{\theta}_a)\right)$$

Further substitution of the conditions of the actuator angle command in equation (13) into equation (14) gives:

$$T_M = K_T K_p(1+K_G)\theta_a + (K_T K_p K_{HWD} + K_T K_{MD} + K_T K_d(1+K_G))\dot{\theta}_a + K_T K_d K_{KWD}\ddot{\theta} - K_T K_p \theta_b - (K_T K_d + K_T K_{MD})\dot{\theta}_b \quad (15)$$

Note that the expression of the actuator motor torque $T_M$ only represents the torque linearized around the operating point defined by an equilibrium point of $(\theta_a^*, \theta_b^*)$ pair. It does not include the steady-state torque necessary to balance shaft torque at the operating point of $K_{TW}\theta_b^*$.

Equation (15) is then substituted into equation (10) to derive the dynamic equations for the simplified system. The two differential equations governing the dynamics of the AFS system are given as:

$$J_{1eq}\ddot{\theta}_a + B_a\dot{\theta}_a + K_T K_p(1+K_G)\theta_a + (K_T K_p K_{HWD} + K_T K_{MD} + K_T K_d(1+K_G))\dot{\theta}_a + K_T K_d K_{HWD}\ddot{\theta}_a - K_T K_p \theta_b - (K_T K_d + K_T K_{MD})\dot{\theta}_b = 0 \quad (16)$$

$$J_{1eq}\ddot{\theta}_a + B_a\dot{\theta}_a + K_T K_p(1+K_G)\theta_a + (K_T K_p K_{HWD} + K_T K_{MD} + K_T K_d(1+K_G))\dot{\theta}_a + K_T K_d K_{HWD}\ddot{\theta}_a - K_T K_p \theta_b - (K_T K_d + K_T K_{MD})\dot{\theta}_b - K_{TW}\theta_b - B_{TW}\dot{\theta}_b \quad (17)$$

Equation (16) is rearranged into the form of a state equation as:

$$\ddot{\theta}_a = \frac{d\omega_a}{dt} = a_{21}\theta_a + a_{22}\omega_a + a_{23}\theta_b + a_{24}\omega_b \quad (18)$$

Where, $$a_{21} = -\frac{K_T K_p(1+K_G)}{J_{1eq} + K_T K_d K_{HWD}} \quad (19)$$

$$a_{22} = -\frac{B_a + K_T K_p K_{HWD} + K_T K_{MD} + K_t K_d(1+K_G)}{J_{1eq} + K_T K_d K_{HWD}}$$

$$a_{23} = -\frac{K_T K_p}{J_{1eq} + K_T K_d K_{HWD}}$$

$$a_{24} = -\frac{K_T K_d + K_T K_{MD}}{J_{1eq} + K_T K_d K_{HWD}}$$

Equation (17) is also re-arranged into the state-equation form as:

$$\ddot{\theta}_b = \frac{d\omega_b}{dt} = a_{41}\theta_a + a_{42}\omega_a + a_{43}\theta_b + a_{44}\omega_b$$

Where, $$a_{41} = -\frac{K_T K_p(1+K_G) + K_t K_d K_{HWD}a_{21}}{J_{2eq}} \quad (20)$$

$$a_{42} = -\frac{K_T K_p K_{HWD} + K_T K_{MD} + K_T K_d(1+K_G) + K_T K_d K_{HWD}a_{22}}{J_{2eq}}$$

$$a_{43} = \frac{K_T K_d K_{HWD}a_{23} - K_T K_p - K_{TW}}{J_{2eq}}$$

$$a_{44} = \frac{-B_b + K_T K_d K_{HWD}a_{24} - K_T K_d - K_T K_{MD} - B_{TW}}{J_{2eq}}$$

Therefore, a system of state equations can be written as:

$$\begin{bmatrix}\dot{\theta}_a \\ \dot{\omega}_a \\ \dot{\theta}_b \\ \dot{\omega}_b\end{bmatrix} = \begin{bmatrix}0 & 1 & 0 & 0 \\ a_{21} & a_{22} & a_{23} & a_{24} \\ 0 & 0 & 0 & 1 \\ a_{41} & a_{42} & a_{43} & a_{44}\end{bmatrix}\begin{bmatrix}\theta_a \\ \omega_a \\ \theta_b \\ \omega_b\end{bmatrix} \quad (21)$$

The state matrix is:

$$A = \begin{bmatrix} 0 & 1 & 0 & 0 \\ a_{21} & a_{22} & a_{23} & a_{24} \\ 0 & 0 & 0 & 1 \\ a_{41} & a_{42} & a_{43} & a_{44} \end{bmatrix} \quad (22)$$

The characteristic equation of the AFS dynamic system is:

$$|sI - A| = 0 \quad (23)$$

That is, $$\begin{vmatrix} s & -1 & 0 & 0 \\ -a_{21} & s - a_{22} & -a_{23} & -a_{24} \\ 0 & 0 & s & -1 \\ -a_{41} & -a_{42} & -a_{43} & s - a_{44} \end{vmatrix} = 0 \quad (24)$$

Manipulating the determinant yields:

$$(s(s-a_{22})-a_{21})(s(s-a_{44})-a_{43})-(a_{42}s+a_{41})(a_{24}s+a_{23})=0 \quad (25)$$

The cross-coupling of the dynamics between the two inertial parts above and below the AFS actuator 22 is determined by the term $(a_{42}s+a_{41})(a_{24}s+a_{23})$ in equation (25).

As it is recognized that the hand-wheel transient overshoot has come from this cross-coupling term, the ideal treatment of the problem is to see if it is possible to completely eliminate the cross-coupling.

The necessary condition for a zero cross-coupling of the AFS dynamics between the upstream and downstream inertias is given as:

$$a_{23} = 0$$

$$a_{24} = 0 \quad (26)$$

or $$a_{41} = 0$$

$$a_{42} = 0 \quad (26)$$

However, from equation (19) it is clear that the condition of equation (26) cannot be satisfied. The only hope to have a complete elimination of the cross-coupling dynamics is from equation (27).

Reducing the parameters $a_{41}$ and $a_{42}$ to be expressed by system parameters gives:

$$a_{41} = \frac{J_{1eq}K_T K_p(1+K_G)}{(J_{1eq}+K_T K_d K_{HWD})J_{2eq}} \quad (28)$$

$$a_{42} = \frac{J_{1eq}(K_T K_p K_{HWD}+K_T K_{MD}+K_T K_d(1+K_G)) - K_T K_d K_{HWD} B_a}{(J_{1eq}+K_T K_d K_{HWD})J_{2eq}} \quad (29)$$

In order for the parameters $a_{41}$ and $a_{42}$ to be zero, it is necessary that all of the motor current control gains, such as $K_p$, $K_d$ and $K_{MD}$, are zero, which is not an acceptable condition. As a result, based on the architecture of the AFS system, it is impossible to have a complete elimination of the cross-coupling dynamics between the two ends of the actuator 22, and at least not be an incorporation of a hand-wheel damping control term.

Even though it is impossible to completely eliminate the cross-coupling dynamics in the AFS system, the hand-wheel damping can still be improved. If there are sufficiently large terms of $K_T K_d K_{HWD}$ in equations (28) and (29), the cross-coupling dynamics can be minimized. If this is the case, the fundamental mode damping ratio of the hand-wheel 12 can be looked at to find a way to improve the damping.

The damping ratio of the fundamental mode of the hand-wheel 12 is given as:

$$\xi_a = \frac{-a_{22}}{2\sqrt{-a_{22}}} \quad (30)$$

$$= \frac{B_a + K_T K_p K_{HWD} + K_T K_{MD} + K_T K_d(1+K_G)}{2\sqrt{K_T K_p(1+K_G)}\sqrt{J_{1eq}+K_T K_d K_{HWD}}}$$

The proportional term of the motor current control contributed by the term associated with a gain $K_p$ serves as an equivalent effect of steering shaft stiffness, the fundamental-mode damping ratio is a function of the hand-wheel damping gain term $K_{HWD}$. The present invention proposes increasing the damping ratio of the AFS system by the adjustment of the damping control term $K_{HWD}$.

If $K_p$ is significantly larger than $K_d$, an increase of the hand-wheel damping term $K_{HWD}$ will increase the fundamental mode damping of the hand-wheel 12. In this case, the gain term $K_{HWD}$ will be a positive number. However, if the magnitude of the gain cannot be increased without a limit, the computation of the control relies on the derivative terms of the command and actuator angle. These derivatives are done by successive approximation with time delay in the signal compared with this ideal counterpart. Time delay coupled with high control gain can cause a limit-cycle oscillation in the control system. As a result, there is a natural limit to the magnitude of the hand-wheel damping gain term $K_{HWD}$.

If $K_d$ is significantly larger than $K_p$, the fundamental mode damping ratio can be increased by using a negative term of $K_{HWD}$. The only limit to the magnitude of the gain is to maintain the term $K_T K_d K_{HWD}$ smaller than $J_{1eq}$ in equation (30). However, this is rarely the case of servo-control when precision of angular position is the most important issue, such as a steering system.

Based on the analysis above, the AFS actuator command $\theta_c$ is modified to add a term for the hand-wheel damping as:

$$\theta_c = (1+K_G)\theta_{HW} + K_{HWD}\frac{d\theta_{HW}}{dt} \quad (31)$$

The damping gain term $$K_{HWD}\frac{d\theta_{HW}}{dt}$$

can be a condition to the status of the vehicle operation. For example, the damping gain term $$K_{HWD}\frac{d\theta_{HW}}{dt}$$

is added only when the closed-loop control flag is inactive as:

$$\theta_c = (1 + K_G)\theta_{HW} + \theta_{Closed\_Loop} + neg(\text{closedloop\_flag}) * K_{HWD}\frac{d\theta_{HW}}{dt} \quad (32)$$

Figure 3:
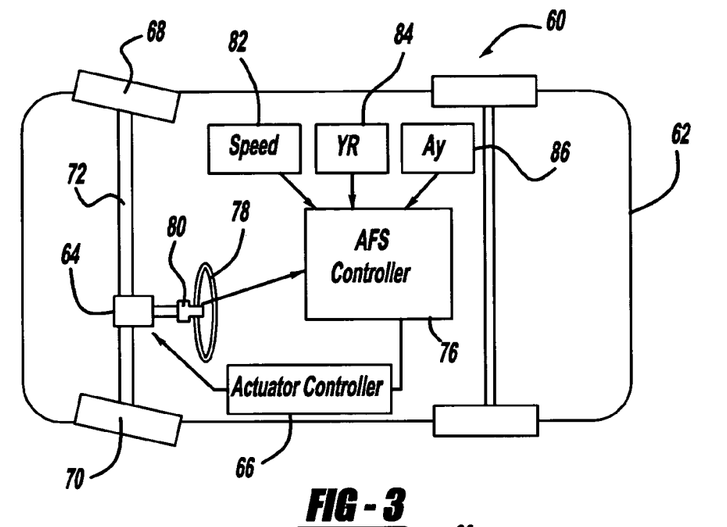
FIG. 3 is a plan view of an active front steering (AFS) system for a vehicle, according to an embodiment of the present invention.

FIG. 3 is a plan view of an AFS control system 60 for a vehicle 62, according to an embodiment of the present invention. The system 60 includes an AFS actuator 64 (representing the actuator 22) that receives a steering command signal from an actuator controller 66 (representing the controller 42). The actuator 64 provides actuation of front wheels 68 and 70 of the vehicle 62 mounted to an axle 72. The vehicle 62 includes a hand-wheel 78 (representing the hand-wheel 12), and a hand-wheel sensor 30 (representing the sensor 16) that provides a hand-wheel angle signal to an AFS controller 76 to provide the vehicle operators steering intention. The system 60 includes a vehicle speed sensor 82, a vehicle yaw rate sensor 84 and a vehicle lateral acceleration sensor 86 that provide a vehicle speed signal Vx, a vehicle yaw rate signal YR and a vehicle lateral acceleration signal Ay, respectively, to the AFS controller 76. When the AFS actuator 64 is activated, an additional amount of steering angle can be provided to the front wheels 68 and 70.

Figure 4:
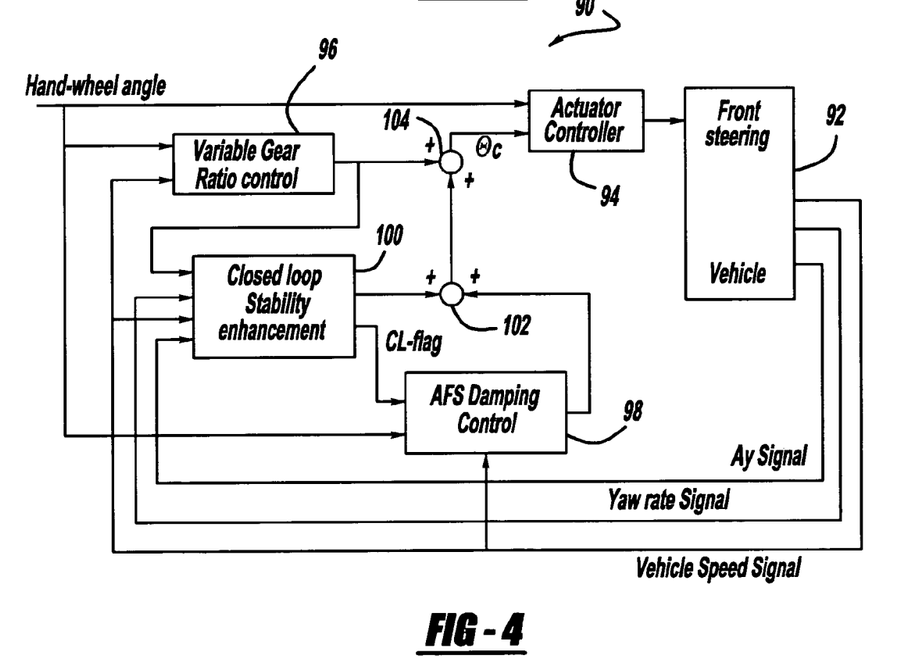
FIG. 4 is a schematic block diagram of the AFS control system shown in FIG. 3.

FIG. 4 is a more detailed block diagram of an AFS control system 90 for a vehicle 92, according to an embodiment of the present invention. The system 90 includes an actuator controller 94 representing the actuator controller 66. The actuator controller 94 provides a front wheel steering control signal to the AFS actuator on the vehicle 92. The hand-wheel angle signal is also provided to a variable gear ratio control process block 96 and an AFS damping control process block 98. The vehicle speed signal Vx from the vehicle speed sensor 82 is also provided to the variable gear ratio control process block 96 and the AFS damping control process block 98. An output signal from the variable gear ratio control process block 96 is provided to a closed-loop stability enhancement process block 100, and the vehicle yaw rate signal YR and the lateral acceleration signal Ay from the sensors 84 and 86, respectively, are provided to the closed-loop stability enhancement process block 100 and the AFS damping control process block 98. A closed-loop flag (CL-flag) is provided from the closed-loop stability enhancement process block 100 to the AFS damping control process block 98. The damping control process block 98 provides the hand-wheel damping control of the invention.

The variable gear ratio control process block 96 generates a gear ratio signal that is the first term $(1+K_G)\theta_{HW}$ in equation (32). As will be appreciated by those skilled in the art, the output of the process block 96 can be provided by many known systems. The process block 100 generates a closed-loop stability enhancement signal used for vehicle stability enhancement (VSE) systems, such as those providing differential braking. One non-limiting example of a system for generating the closed-loop stability enhancement signal can be found in U.S. Pat. No. 5,746,486 titled Brake Control System, assigned to the assignee of this application and herein incorporated by reference. The closed-loop stability enhancement signal from the process block 100 is the second term $\theta_{Closed\_Loop}$ in equation (32).

The stability enhancement control is closed loop in that it is only activated when the vehicle conditions are serious enough to provide the control. When the closed-loop stability enhancement signal is on, then the AFS damping control signal from the process block 98 may interfere with the stability enhancement control. Therefore, it is desirable to turn off the damping control signal when the vehicle stability enhancement signal is being provided. Thus, the closed-loop stability enhancement process block 100 generates the CL-flag that is provided to the AFS damping control process block 98. When the CL-flag is one, meaning that the stability enhancement control signal is on, the AFS damping control process block 98 sets the damping control signal to zero. The output of the AFS damping control process block 98 is the third term $$K_{HWD}\frac{d\theta_{HW}}{dt}$$

in equation (32).

The output of the process blocks 98 and 100 are added together in an adder 102. As discussed above, one of these outputs will be zero. The AFS damping control signal from the process block 98 or the closed-loop stability enhancement signal from the process block 100 will then be added to the variable gear ratio control signal from the process block 96 to generate the steering command signal $\theta_c$ by equation (32). The command signal $\theta_c$ is added to the hand-wheel angle signal in the actuator controller 94 to provide the actuator control signal to the vehicle 92.

Figure 5:
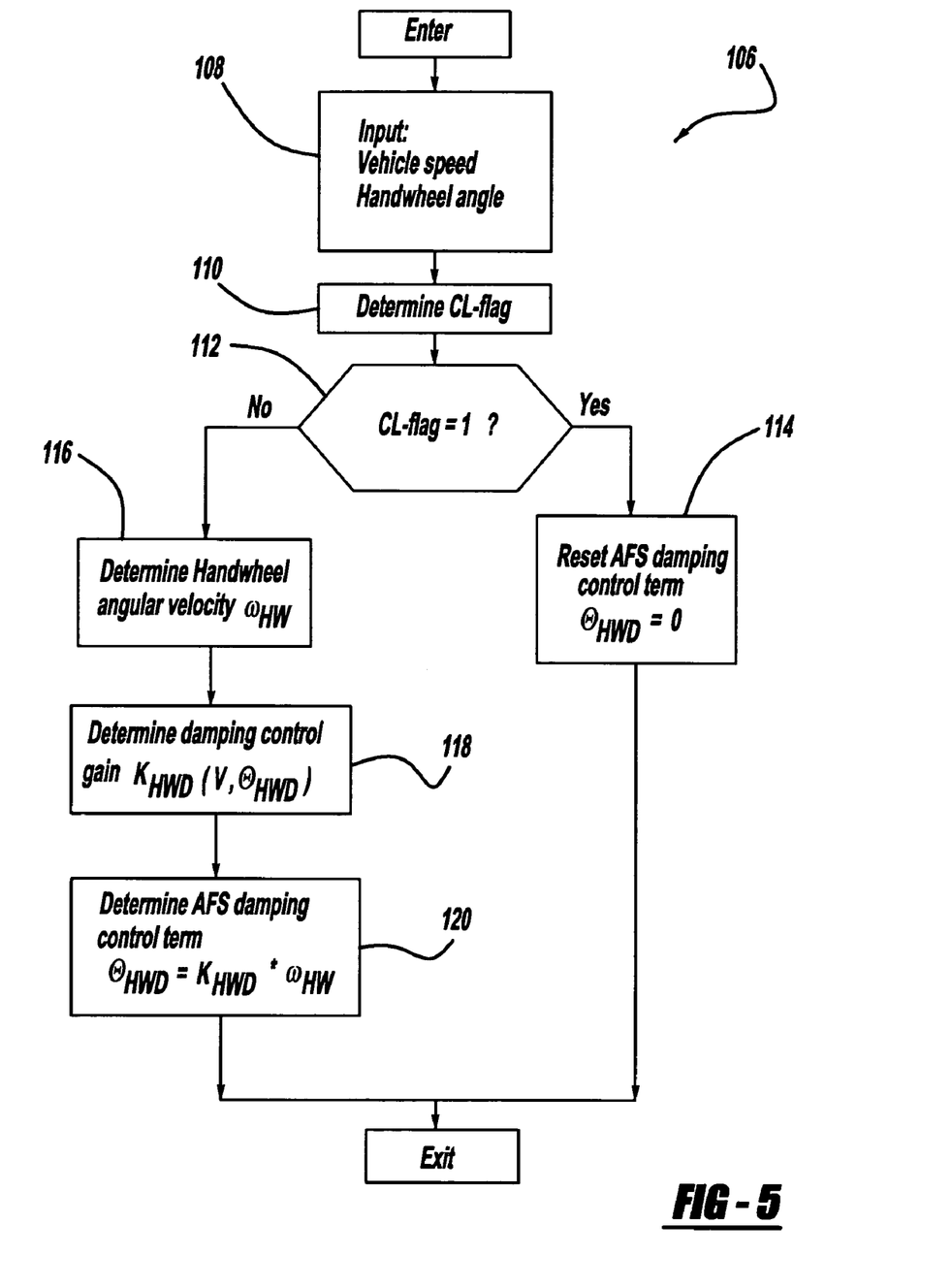
FIG. 5 is a flow chart diagram showing a process for determining an AFS damping control signal, according to the invention.

FIG. 5 is a flow chart diagram 106 showing the operation of the algorithm used in the AFS damping control process block 98, according to one embodiment of the present invention. The algorithm first reads the input information including the vehicle speed signal Vx speed and the hand-wheel angle signal from the hand-wheel angle sensor 30 at box 108. The algorithm then determines the value of the CL-flag at box 110. The algorithm then determines if the CL-flag is equal to one at decision diamond 112. If the CL-flag is equal to one at the decision diamond 112, then the algorithm sets the AFS damping control term $\theta_{HWD}$ equal to zero at box 114. As discussed above, if the stability enhancement system is activated, then the damping control signal is not used in the steering control.

If the CL-flag is not equal to one at the decision diamond 112, then the algorithm determines the hand-wheel angular velocity $$\omega_{HW}\left(\frac{d\theta_{HW}}{dt}\right)$$

at box 116. The algorithm then determines the damping gain term $K_{HWD}$ based on the vehicle speed signal Vx and the hand-wheel angle $\theta_{HWD}$ at box 118. Tables 1 and 2 below give exemplary values for the gain term $K_{HWD}$ based on the hand-wheel angle $\theta_{HWD}$ and the vehicle speed signal Vx, respectively. The algorithm multiplies the two gain values together to provide the gain term $K_{HWD}$ used in the damping control signal. The algorithm then determines the AFS damping control term $K_{HWD}*\omega_{HW}$ at box 120.

TABLE 1

| | HWA (deg) | | | | | | | | | | |
|---|---|---|---|---|---|---|---|---|---|---|---|
| | 0 | 45 | 90 | 135 | 180 | 225 | 270 | 315 | 360 | 405 | 450 |
| Gain | 0.0273 | 0.0273 | 0.0273 | 0.0273 | 0.0136 | 0 | 0 | 0 | 0 | 0 | 0 |

TABLE 2

| | Speed (kph) | | | | | | | | | | |
|---|---|---|---|---|---|---|---|---|---|---|---|
| | 0 | 5 | 10 | 20 | 30 | 40 | 50 | 60 | 70 | 80 | 100 |
| Gain | 1 | 0.7 | 0.3 | 0.1 | 0.1 | 0.05 | 0 | 0 | 0 | 0 | 0 |

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing active front steering for a vehicle that includes hand-wheel damping control, said method comprising:
   providing a vehicle speed signal of the speed of the vehicle;
   providing a hand-wheel steering angle signal indicative of the vehicle operator's desired steering direction;
   generating a damping control signal using the vehicle speed signal and the steering angle signal; and
   apply the damping control signal to a controller that controls the steering of the vehicle, said damping control signal providing the hand-wheel damping control.

2. The method according to claim 1 further comprising adding the damping control signal to a variable gear ratio control signal to generate a steering command signal applied to the controller.

3. The method according to claim 1 further comprising setting the damping control signal to zero if a closed-loop stability enhancement signal is activated.

4. The method according to claim 1 wherein the damping control gain based on the vehicle speed and the damping control based on the hand-wheel angle are provided by look-up tables.

5. The method according to claim 1 wherein providing a steering angle signal includes using a hand-wheel angle sensor mounted to a steering column of the vehicle.

6. The method according to claim 1 wherein the controller is an actuator controller that controls an actuator that provides the vehicle steering.

7. An active front steering system for a vehicle, said system comprising:
   a vehicle speed sensor for providing a vehicle speed signal of the speed of the vehicle;
   a steering angle sensor providing a steering angle signal indicative of the vehicle operator's desired steering direction;
   a damping control sub-system responsive to the vehicle speed signal and the steering angle signal, said damping control sub-system generating a damping control signal for providing vehicle hand-wheel damping; and
   a controller responsive to the damping control signal, said controller controlling an actuator that controls the steering of the vehicle.

8. The system according to claim 7 wherein the damping control sub-system generates the damping control gain by multiplying a damping control gain based on vehicle speed with a damping control gain based on the steering angle signal.

9. The system according to claim 8 wherein the damping control sub-system uses look-up tables for providing the damping control gain based on vehicle speed and the damping control gain based on the steering angle signal.

10. The system according to claim 7 further comprising a variable gear ratio control sub-system, said variable gear ratio control sub-system generating a steering command based on the vehicle speed signal and the steering angle signal, wherein the steering command is added to the damping control signal to generate a steering command signal applied to the controller.

11. The system according to claim 7 further comprising a closed-loop stability enhancement sub-system, said closed-loop stability enhancement sub-system providing a stability enhancement signal, wherein the damping control signal is set to zero if the stability enhancement signal is activated.

12. The system according to claim 7 wherein the steering angle sensor is a hand-wheel angle sensor mounted to a steering column of the vehicle.

* * * * *